United States Patent
Nazarian, Jr. et al.

(10) Patent No.: US 9,434,228 B1
(45) Date of Patent: Sep. 6, 2016

(54) VEHICLE COMPONENT MOUNTING APPARATUS, AND METHODS OF USE AND MANUFACTURE THEREOF

(71) Applicant: Honda Motor Co., Ltd., Tokyo (JP)

(72) Inventors: James H. Nazarian, Jr., North Hollywood, CA (US); Robert James Dunham, III, Castaic, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/811,471

(22) Filed: Jul. 28, 2015

(51) Int. Cl.
*B60G 13/00* (2006.01)
*B62D 65/12* (2006.01)
*B60G 15/06* (2006.01)

(52) U.S. Cl.
CPC ........... *B60G 13/003* (2013.01); *B60G 15/068* (2013.01); *B62D 65/12* (2013.01); *B60G 2204/128* (2013.01); *B60G 2204/418* (2013.01); *B60G 2206/80* (2013.01); *B60G 2206/91* (2013.01)

(58) Field of Classification Search
CPC .............. B60G 13/003; B60G 15/068; B60G 2204/128; B60G 2204/418; B60G 2206/80; B60G 2206/91; B62D 65/12
See application file for complete search history.

(56) References Cited

U.S. PATENT DOCUMENTS

| | | | | |
|---|---|---|---|---|
| 4,274,655 | A * | 6/1981 | Lederman | ............ B60G 15/068 267/220 |
| 4,712,776 | A * | 12/1987 | Geno | ............... B60G 15/14 188/322.12 |
| 4,817,983 | A | 4/1989 | Virani | |
| 4,958,849 | A | 9/1990 | Pinch et al. | |
| 5,487,535 | A * | 1/1996 | Carter | ............... B60G 15/062 267/220 |
| 6,382,645 | B1 * | 5/2002 | Gravelle | ............. B60G 15/068 280/124.147 |
| 7,448,478 | B2 | 11/2008 | Thomas | |
| 8,596,661 | B2 | 12/2013 | Kaneko et al. | |
| 8,740,233 | B2 | 6/2014 | Morishige et al. | |
| 8,888,081 | B2 | 11/2014 | Inoue | |
| 2005/0029062 | A1 | 2/2005 | Dean et al. | |
| 2005/0133322 | A1 * | 6/2005 | Huprikar | ............. B60G 13/003 188/321.11 |
| 2007/0144850 | A1 | 6/2007 | Hattori | |
| 2007/0164527 | A1 | 7/2007 | Mathis et al. | |
| 2008/0303196 | A1 * | 12/2008 | Lyew | ................. B60G 15/068 267/33 |

* cited by examiner

*Primary Examiner* — Faye M Fleming
(74) *Attorney, Agent, or Firm* — Kenealy Vaidya LLP

(57) ABSTRACT

Some embodiments are directed to a structure for mounting a damper to a vehicle structural member. The structure includes a hollow rigid mount body having an upper portion that extends through a structural member aperture so as to project above the member, and a lower portion disposed beneath the member. The lower portion outer diameter can be larger than the upper portion outer diameter. A securing member is disposed around the rigid mount body, so that the vehicle structural member is located between the securing member and rigid mount body lower portion. A bearing assembly is disposed within the rigid mount body lower portion, and configured to retain an upper portion of the piston rod of the damper within the rigid mount body lower portion, while allowing the piston rod to move in a direction at an angle relative to an axis of the aperture of the vehicle structural member.

20 Claims, 5 Drawing Sheets

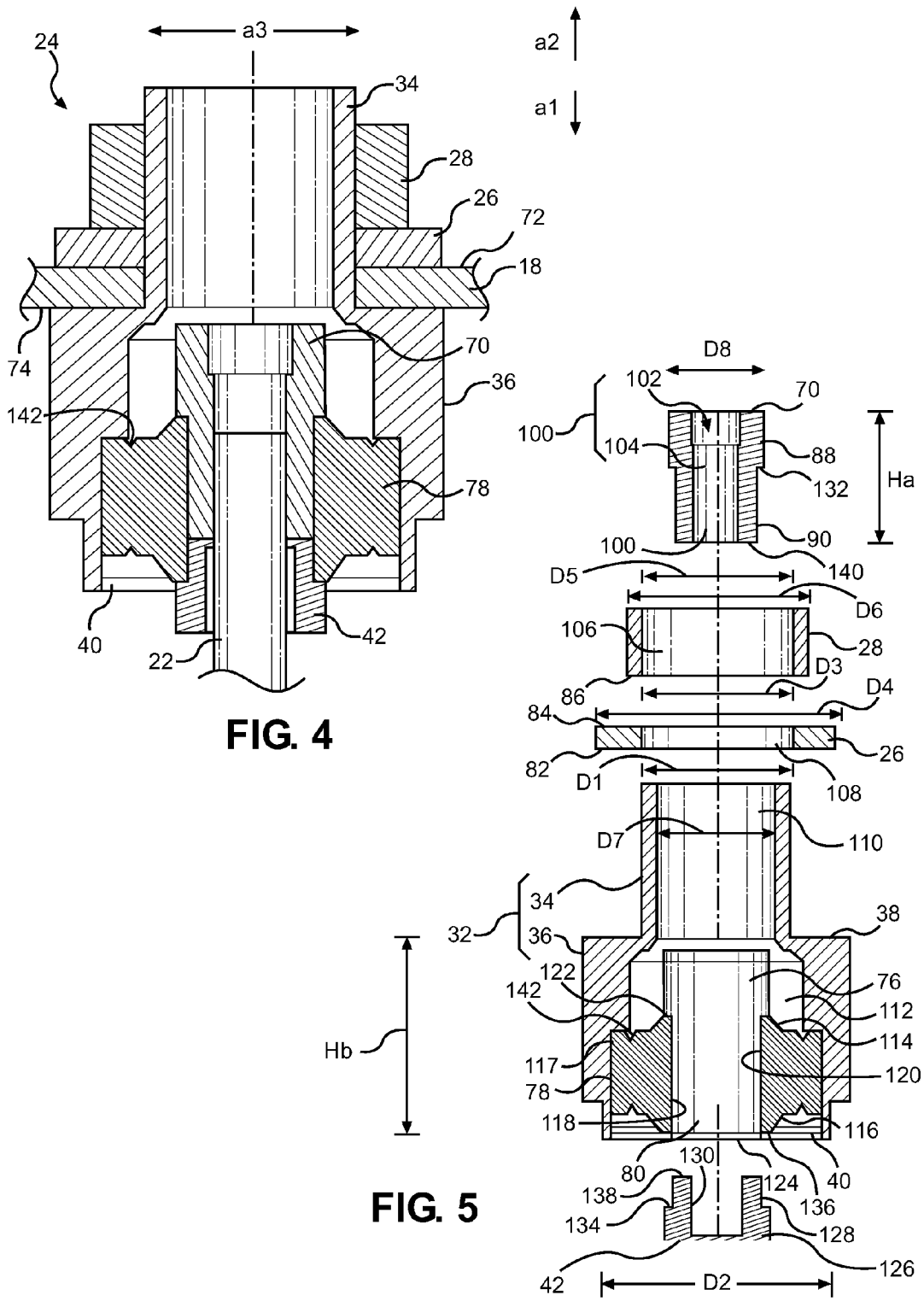

VEHICLE COMPONENT MOUNTING APPARATUS, AND METHODS OF USE AND MANUFACTURE THEREOF

BACKGROUND

The disclosed subject matter relates to vehicle component mounting apparatus, and methods of use and manufacture thereof. In particular, the disclosed subject matter relates to methods and apparatus for mounting dampers, shock absorbers, etc. to vehicle bodies, such as to achieve non-compliant mountings.

Vehicles can be constituted by an assembly of multiple separate components that are connected or otherwise mounted together. The manner in which the connection of these components is achieved may be dependent on various factors, such as the structure or the components, the operation or purpose of the components, etc.

As one example, some vehicles, and especially those that travel over land, include suspension systems that need to be directly or indirectly connected to other vehicle components, such as a body of the vehicle. These suspension systems may enhance performance and comfort of on-road and off-road vehicles, such as by handling or otherwise dissipating a shock load, which may be applied in a back-and-forth direction, that is communicated to a vehicle wheel under certain circumstances, e.g., when the wheel encounters an uneven or rough surface on a path of travel. The suspension systems can include dampers (also referred to herein as shock absorbers) that can absorb or otherwise dissipate vibrations of the shock load, which can enhance performance (by increasing friction between the wheels and the surface on which the vehicle travels) and occupant comfort. The dampers can be disposed between an un-sprung and sprung mass of the vehicle, and can provide a smooth ride as perceived by all of the vehicle occupants, or can enable a driver to more easily maintain control of the vehicle at higher speeds and with less effort by absorbing some or all of the shock, vibrations, etc. resulting from the vehicle's movement along the path.

The desired type and amount of dampening may depend on various factors, including the type of vehicle, intended use of vehicle, path along which the vehicle is intended to travel, etc. As one example, dampers for racing vehicles tend to be designed less for occupant comfort, and instead typically use higher damping ratios to reduce oscillation resulting from high rates of travel along an uneven path.

SUMMARY

Dampers need to be mounted or otherwise directly or indirectly connected to other vehicle components, such as the vehicle body, in a manner that facilitates or otherwise enables performance of their intended function, i.e., absorbing shocks, vibrations, etc. However, certain challenges exist to sufficiently securing dampers in a manner that does not impede their function.

For example, some related art damper mount structure solutions exist that secure at an upper end of a suspension piston rod of a strut or damper to a bearing that is carried within a mount member. This mount member can be constructed or otherwise formed of a compliant material, which in turn is secured the vehicle body. Rubber bushings can be used in a compliant damper mount structure to operate as rubber insulators between metallic members. These rubber bushings can be effective based upon their vibration damping ability and the flexibility of movement that is imparted to the damper and mounting members.

However, these types of bushing-type damper mount structures may be subject to various disadvantages, especially in high performance or racing implementations. It may be more effective for high performance vehicles and racing vehicles to utilize non-compliant damper mounts to achieve better suspension performance. In addition, a vertically compliant damper mount structure can result in disadvantageous handling of a racing vehicle, such as with regard to weight transfer under braking or acceleration, pitch/dive, transient roll balance, lateral grip and roll rates in transitions, pulling or wandering of the vehicle, sluggish steering response, etc.

It may therefore be advantageous to provide a damper mount that does not require, avoids, or otherwise fails to include a bushing-type damper mount (e.g., bushings made of a compliant material, such as rubber disposed on either side of a vehicle structural member sandwiching the structural member). It may be especially advantageous to avoid this structure in damper installations where a non-compliant mounting is desired, such as where a damper rod or pin passes through the vehicle structural member and/or body panel.

Some embodiments therefore address at least one of the above and/or other disadvantages of the related art, such as undesired compliance in a suspension system that is caused by compliant dampener mounting structures. Some of these embodiments include a bearing structure that can provide sufficient angular compliance to compensate for suspension movement during use without the addition of undesired vertical compliance. Some embodiments provide a rigid damper mount structure that can partially or fully remove axial compliance from the piston rod that is clamped around the vehicle body.

Some embodiments are therefore directed to a structure for mounting a damper that includes a piston rod to a vehicle structural member that defines an aperture. The structure can include a hollow rigid mount body that includes an upper portion that extends through the aperture so as to project above the vehicle body panel, and a lower portion that is disposed beneath the vehicle structural member. The lower portion can define an outer diameter that is larger than an outer diameter of the upper portion. A rigid mount securing member can be configured to be disposed around an exterior of the upper portion of the rigid mount body, and so that the vehicle structural member is located between the rigid mount securing member and the lower portion of the rigid mount body. A bearing assembly can be disposed within the lower portion of the rigid mount body, and configured to retain an upper portion of the piston rod of the damper within the lower portion of the rigid mount body, while allowing the piston rod to move in a direction at an angle relative to an axis of the aperture of the vehicle structural member.

Some other embodiments are directed to a damper assembly that is configured for mounting to a vehicle body panel that defines an aperture. The damper assembly can include a damper that includes a piston rod; and a structure for mounting the damper to the vehicle body panel. The structure can include a hollow rigid mount body that includes an upper portion that extends through the aperture so as to project above the vehicle body panel, and a lower portion that is disposed beneath the vehicle body panel. The lower portion can define an outer diameter that is larger than an outer diameter of the upper portion. A rigid mount securing member can be configured to be disposed around an exterior of the upper portion of the rigid mount body, and so that the vehicle body panel is located between the rigid mount securing member and the lower portion of the rigid mount body. A bearing assembly can be disposed within the lower portion of the rigid mount body, and configured to retain an upper portion of the piston rod of the damper within the lower portion of the rigid mount body, while allowing the piston rod to move in a direction at an angle relative to an axis of the aperture of the vehicle body panel.

Still other embodiments are directed to a method of mounting a damper, which includes a piston rod, to a vehicle body panel that defines an aperture. The method can include: extending an upper portion of a hollow rigid mount body through the aperture so as to project above the vehicle body panel; disposing a lower portion of the hollow rigid mount body beneath the vehicle body panel, the lower portion being configured so as to define an outer diameter that is larger than an outer diameter of the upper portion; disposing a rigid mount securing member around an exterior of the upper portion of the rigid mount body, so that the vehicle body panel is located between the rigid mount securing member and the lower portion of the rigid mount body; and disposing a bearing assembly within the lower portion of the rigid mount body so that the bearing assembly retains an upper portion of the piston rod of the damper within the lower portion of the rigid mount body, while allowing the piston rod to move in a direction at an angle relative to an axis of the aperture of the vehicle body panel.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which:

FIG. 4 is a cross-sectional view of the exemplary damper mount structure of FIG. 1.

FIG. 5 is an exploded sectional view of the exemplary damper mount structure of FIG. 4.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Vehicle Suspension System

Figure 1:
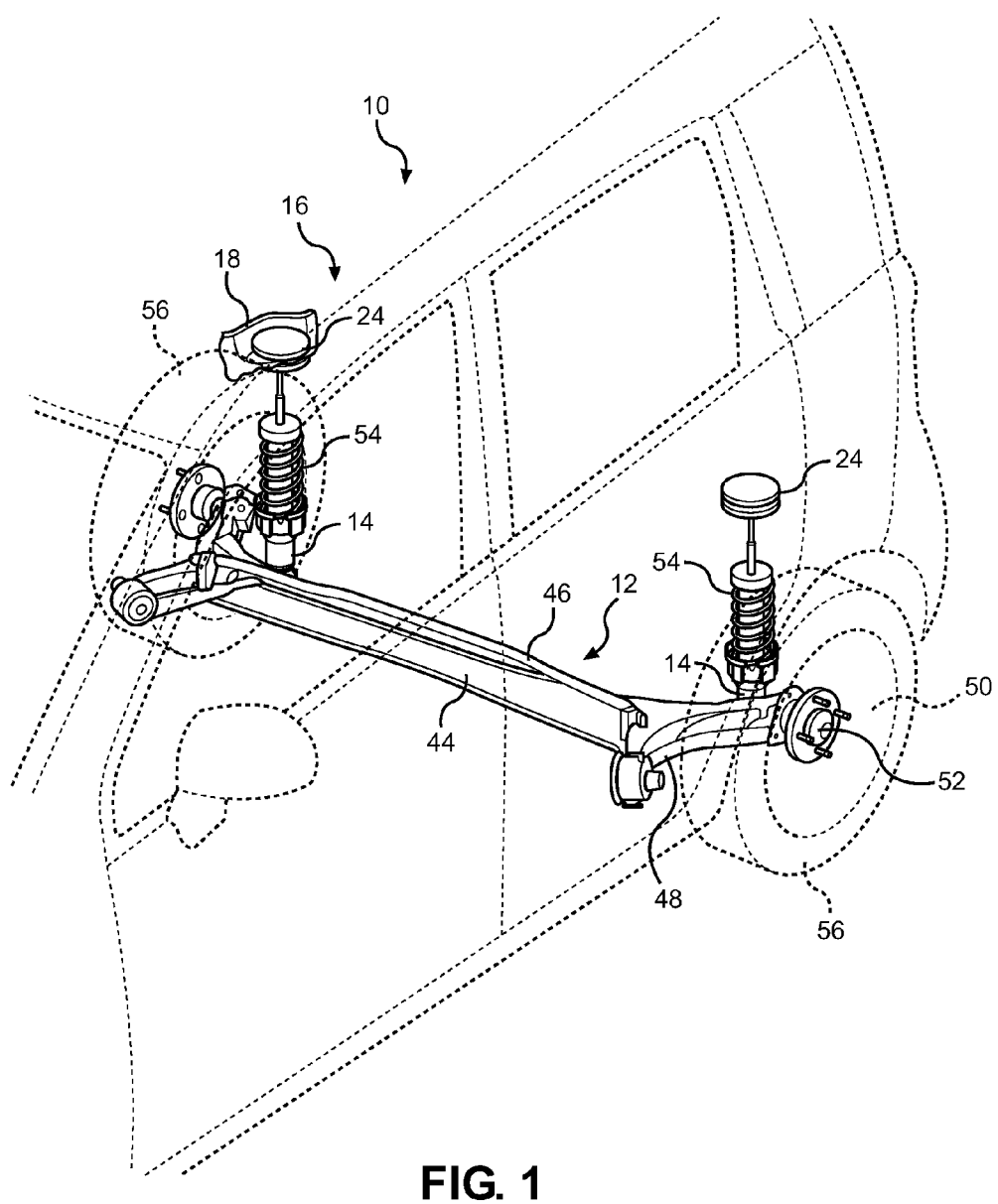
FIG. 1 is a perspective view of a rear suspension system with a damper and exemplary damper mount structure in accordance with the disclosed subject matter.

FIG. 1 is a perspective view of a rear suspension system with a damper and exemplary damper mount structure in accordance with the disclosed subject matter. A trailing link rear suspension system 12 is symmetrically arranged with respect to a longitudinal centerline of a vehicle 10. Embodiments, however, are intended to include or otherwise cover vehicle damper mount structures used in any vehicle suspension system including solid axle systems, dead axle systems (e.g., de Dion tube), independent systems (e.g., double A-arm, short-long arm, etc.) or any other known, related art or later developed vehicular suspension application.

The rear suspension system 12 can include a solid axle beam 44, a stabilizer bar 46, and a pair of trailing arms 48. A pair of rear wheels 50 can be mounted onto rear hubs 52, and a pair of coil springs 54 can each encircle a respective pair of dampers 14 in a coil-over configuration. Ends of the trailing arms 48 are attached to opposite ends of the axle beam 44, and the other ends of the trailing arms 48 are attached to rear hubs 52. Tires 56 can be mounted onto rear wheels 50, with the hubs being coaxial with the rear wheels 50 and tires 56.

An exemplary damper 14 and damper mount structure 24 is provided at each trailing arm 48. The dampers 14 and damper mount structures 24 are symmetrically arranged with respect to the longitudinal centerline of the vehicle 10.

The damper 14 of the rear suspension system 12 is fastened to a component of the vehicle body 16 of the vehicle 10. In particular, the damper 14 includes a piston rod 20 and a mounting shaft portion 22 (that is distal to the piston rod 20), which is attached to a vehicle structural member 18 of the vehicle body 16 by the damper mount structure 24. The vehicle structural member 18 can be configured as any appropriate structure capable of supporting dynamic loads input from the wheels of the vehicle to the vehicle body. For example, the vehicle structural member can be configured as a frame component, a body panel component or any other appropriate structural component of the vehicle.

Figure 2:
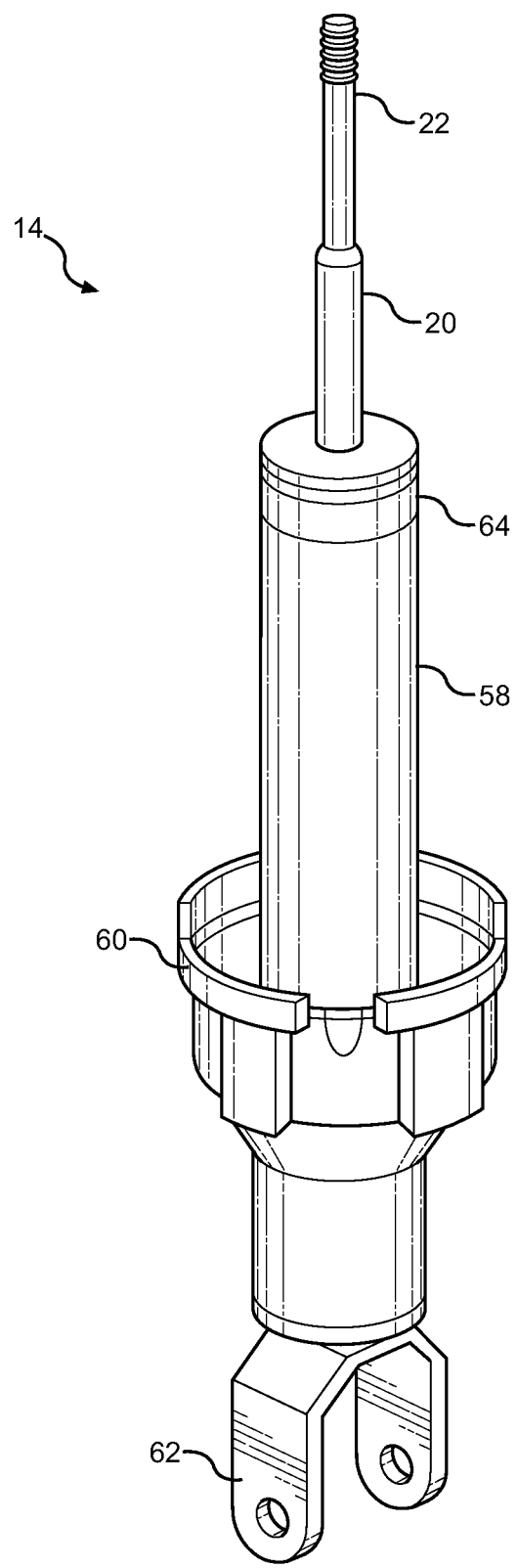
FIG. 2 is a perspective view of an embodiment of the vehicle damper of FIG. 1.

FIG. 2 is a perspective view of an embodiment of the vehicle damper of FIG. 1. Embodiments are intended to include or otherwise cover any known, related art, or later developed damper or damper structure, including but not limited to a Macpherson strut, an active suspension, etc. The damper 14 can include the mounting shaft portion 22, the piston rod 20, a cylinder body 58, a lower spring seat 60, and a damper lower mount 62. The cylinder body 58 can enclose or otherwise include a cylindrical member and any type of damper or shock body, such as but not limited to a threaded shock body for a coil-over strut, for use with any type a damping mechanism including a mono-tube, twin tube, pneumatically actuated, active suspension, etc. In a coil-over strut, the coil spring 54 encircles the cylinder body 58, and is removably attached at a spring upper mount portion 64 with an upper spring seat (not shown), and at a lower end of the cylinder body 58 with the lower spring seat 60.

The damper 14 can attach to a suspension member in any appropriate manner, such as but not limited to mechanical fasteners, glue, epoxy, welding, pressure fitting, etc. In the embodiment in FIG. 2, the damper lower mount 62 can include an eye style mount that can attach to the trailing arm 48. In other embodiments, the damper lower mount 62 can attach to other suspension members, such as an A-arm, a knuckle for a McPherson strut, etc. The mounting shaft portion 22 can attach to the vehicle body panel 18 using the exemplary damper mount structure 24, which is described in more detail below.

II. Damper Mount Structure

FIG. 4 is a cross-sectional view of the exemplary damper mount structure of FIG. 1; and FIG. 5 is an exploded sectional view of the exemplary damper mount structure of FIG. 4. As shown in these figures, the damper mount structure 24 can include a rigid mount body 32, a rigid mount securing member 28, a rigid mount disk 26, a damper securing member 70 (e.g., a nut), a bearing 78, and a bearing lock 40.

The rigid mount body 32 can include an upper portion 34 (e.g., an annular projection) and a lower portion 36 (e.g., a housing body), the lower portion being configured so as to define an outer diameter that is larger than an outer diameter of the upper portion. The rigid mount body 32 can be formed as a unitary or multi-part body, and be configured in any appropriate shape that can cooperate with the rigid mount securing member 28 to secure the mounting shaft portion 22 of the damper 14 to the vehicle body panel 18. The rigid mount disk 26 (e.g., a rigid washer) can be tightened by the rigid mount securing member 28 (e.g., a rigid mount securing nut) to the vehicle body panel 18.

The bearing lock 40 can be integrally fixed to the housing body 36. A tightening force (e.g., an axial force) exerted by the rigid mount securing nut 28 can be transmitted through the annular projection 34 that secures the rigid mount body 32 to the vehicle body panel 18.

A suspension system for the vehicle 10 can include the piston rod 20 of the damper 14 of the rear suspension system 12, and the vehicle body panel 18. The mounting shaft portion 22 of the piston rod 20 can be inserted into the housing body 36 and fastened vehicle body panel 18. The damper mount structure 24 further includes the rigid mount disk 26 interposed between the rigid mount securing nut 28 and an upper surface 72 of the vehicle body panel 18. The rigid mount disk 26 is subjected to the pressure of the rigid mount securing nut 28 screwed onto the annular projection 34.

An upper surface 38 of the housing body 36 can be disposed between a lower surface 74 of the vehicle body panel 18 in opposed relation to the rigid mount disk 26, with the vehicle body panel 18 interposed between the housing body 36 and the rigid mount disk 26.

The lower surface 74 of the vehicle body panel 18 faces in a direction of arrow a1 (see FIG. 4), which indicates a downward direction of the vehicle 10. Arrow a2 (see FIG. 4) indicates an upwardly direction of the vehicle 10, and arrow a3 (see FIG. 4) indicates a transverse direction of the vehicle 10.

As shown in FIG. 5, the annular projection 34 can be a cylindrical member that protrudes from the housing body 36 toward the vehicle body panel 18 (e.g., away from the vehicle's trailing arm 48). The annular projection 34 has an outer diameter D1 that is smaller than the outer diameter D2 of the housing body 36. The rigid mount disk 26 has an inner diameter D3 that is larger than the outer diameter D2 of the annular projection 34, but smaller than diameter D2 of the housing body 36 in order to slidably fit around the annular projection 34. The rigid mount disk 26 has an outer diameter D4 that is greater than the annular projection 34 outer diameter D1, such that a lower surface 82 of the rigid mount disk 26 can contact the upper surface 72 of the vehicle body panel 18.

The rigid mount securing nut 28 can have an inner diameter D5 that is approximately the same as the inner diameter D3 of the rigid mount disk 26 in order to fit around the cylindrical body of the annular projection 34. The rigid mount securing nut 28 has an outer diameter D6 that may be equal to or less than an outer diameter D4 of the rigid mount disk 26, such that a lower surface 86 of the rigid mount securing nut 28 can fully contact the upper surface 84 of the rigid mount disk 26 when assembled. The annular projection 34 has an inner diameter D7 that can allow passage of the damper securing nut 70 therethrough.

The damper mount structure 24 further includes the damper securing nut 70 disposed axially within a through-channel 76 of the housing body 36, and disposed to fit around the mounting shaft portion 22 of the piston rod 20 in housing body 36. The damper securing nut 70 can be a cylindrical member, and can include a head portion 88, a body portion 90, a through-channel 100 that includes a head connector 102, and a body channel 104 that can receive the mounting shaft portion 22. The head portion 88 diameter D8 of the damper securing nut 70 can be greater than a diameter of the body portion 90 to accommodate an internal diameter of the head connector 102, which is greater than a diameter of the body channel 104.

The damper securing nut 70 has an axial height Ha approximately equal to the internal height Hb of the housing body 36 through-channel 76, such that the damper securing nut 70 can fit completely housed inside of a through-channel 76 of the housing body 36. A diameter D8 of the damper securing nut 70 is less than the internal diameter D5 of an axially centric channel 106 for the rigid mount securing nut 28, the internal diameter D3 of an axially centric opening 108 of the rigid mount disk, an axially centric internal channel 110 of the annular projection 34, and the diameter D2 of the through-channel 76 of the housing body 36, so that the damper securing nut 70 may pass through a channel or opening of each member.

The damper securing nut 70 can be integrally fixed within the through-channel 76 of the housing body 36 and attach to the bearing 78 in any appropriate manner, such as but not limited to mechanical fasteners, glue, epoxy, welding, pressure fitting, etc.

The bearing 78 is a generally cylindrical member that can be disposed axially within the through-channel 76 of the housing body 36, and fitted around the damper securing nut 70. The bearing 78 can be interposed between the wall 112 of the through-channel 76 and the damper securing nut 70. The bearing 78 can include an upper frusto-conical surface 114, a lower frusto-conical surface 116, a cylindrical portion 117 that extends away from the surfaces 114 and 116, and an opening portion 118. The opening portion 118 has a diameter greater than a diameter of damper securing nut body portion 90 to allow the body portion 90 to pass therethrough, but less than the head portion diameter D8 such that the head portion 90 of the damper securing nut 70 cannot pass therethrough.

The upper frusto-conical surface 114 and the lower frusto-conical surface 116 are the upper and lower surfaces of an expanded inner contact surface 120 of the bearing 78 that securely attach to the damper securing nut body portion 90. A top end surface 122 of the upper frusto-conical surface 114 can contact a ridge 132 of the damper securing nut 70 that is formed by the expanded diameter D8 of head portion 88 extending beyond a diameter of the body portion 90 of the damper securing nut 70.

The bearing 78 can be secured within the housing body 36 with the annular bearing lock 40 that can be disposed within a lower end 80 of the housing body through-channel 76. The lower frusto-conical surface 116 can attach to the annular bearing lock 40 in any appropriate manner, such as but not limited to mechanical fasteners, glue, epoxy, welding, pressure fitting, etc.

In an alternative embodiment, the rigid mount structure 24 can further include a bearing adapter 42 disposed axially to the housing body 36 within a lower end 80 of the housing body through-channel 76, and can be partially disposed outside of the housing body through-channel 76. The bearing adapter 42 can enable support for the coil spring 54, a bump rubber, or a travel limiting device as desired for specific vehicle 10 requirements.

The bearing adapter 42 can be a cylindrical member, and can include a head portion 126, a body portion 128, and a through-channel 130. The bearing adapter 42 can pass through an opening portion 136 of the bearing lock 40 and integrally attach to the bearing 78. An outer surface of body portion 128 of the bearing adapter 42 can attach to the inner contact surface 120 of the bearing 78. When attached in such a configuration, an end surface 138 of the body portion 128 of the bearing adapter 42 can abut an end surface 140 of the body portion 90 of the damper securing nut 70. A diameter of the through-channel 130 of the bearing adapter 42 can be greater than a diameter of the mounting shaft portion 22, such that the through-channel 130 can slidably receive the mounting shaft portion 22.

The ridge 134 of the bearing adapter 42 can be formed by an expanded diameter of the head portion 126 extending beyond a diameter of the body portion 128. A bottom end surface 124 of the lower frusto-conical surface 116 can contact the ridge 134 of the bearing adapter 42, and function as a stop to the body portion 128 of the bearing adapter 42 when an outer surface of body portion 128 of the bearing adapter 42 attaches to the inner contact surface 120 of the bearing 78. The bearing 78 can further include a ringed pair of notches 142 disposed on opposing sides of cylindrical portion 117 of bearing 78.

Figure 3:
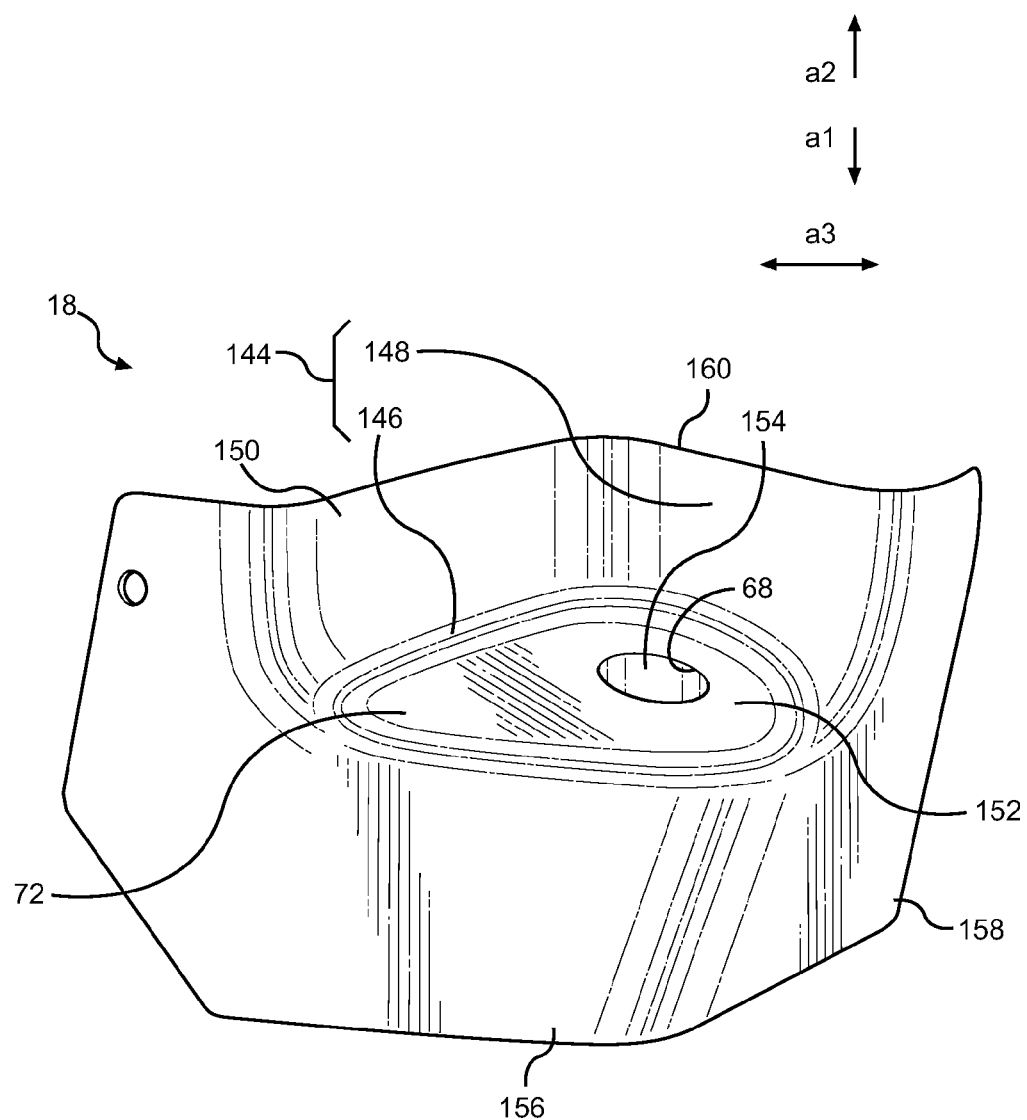
FIG. 3 is a perspective view of a section of a vehicular body panel for attachment to the exemplary damper mount structure of FIG. 1.

FIG. 3 is a perspective view of a section of a vehicular body panel for attachment to the exemplary damper mount structure of FIG. 1. The vehicle body panel 18 can include a damper base 144 that is contiguous with the vehicle body 16, which can further include a damper stiffener portion 146 and a base body 148. The damper stiffener portion 146 can be formed as a contiguous or unitary part of the damper base 144. However, in alternative embodiments, the stiffener portion 146 can constitute a separate member that overlays the damper base 144. The stiffener portion 146 can contact the rigid mount disk 26 when the stiffener portion 146 is interposed between the rigid mount disk 26 and the annular projection 34, and when the stiffener portion 146 and annular projection 34 are secured together by the rigid mount securing nut 28.

The damper base 144 includes the base body 148 extending from an inner panel 150 of the vehicle body 16. The base body 148 defines a fastening seat 152. The mounting shaft portion 22 of the piston rod 20 is fastened to the fastening seat 152 of the base body 148. The base body 148 includes a first rib 156, a second rib 158, and a joining flange 160, which are perpendicular to the base body 148, or alternatively are joined to the stiffener portion 146 at angles less than 90 degrees. The joining flange 160 overlaps and is joined to the inner panel 150 of the vehicle 10.

The fastening seat 152 includes an opening portion 68 forming a through-hole 154 in the fastening seat 152. The through-hole 154 has a diameter that is set to allow passage therethrough of the annular projection 34 from underneath the vehicle body panel 18. The rigid mount securing nut 28 and rigid mount disk 26 cooperate with the annular projection 34 to hold the housing body (and therefore the mounting shaft portion 22 of the piston rod 20) to the vehicle body panel 18. In alternative embodiments, the through-hole 154 can be formed in any polygonal shape that can allow the annular projection 34 (with appropriate adapters) to pass through.

III. Damper Mount Structure Assembly

The damper mount structure 24 can include the rigid mount body 32 that houses the bearing 78 in the lower portion 36 (e.g., the housing body) below the vehicle body panel 18, and the upper portion 34 (e.g., the annular projection) secured to the vehicle body 16 above the vehicle body panel 18 by the rigid mount securing member (e.g., the rigid mount securing nut 28).

The annular projection 34 can be received from below the vehicle body panel 18, and through the through-hole 154 in the fastening seat 152. The annular projection 34 is secured to the vehicle body panel 18 by the rigid mount securing nut 28 and the rigid mount disk 26, which can be interposed between the rigid mount securing nut 28 and the upper surface 72 of the vehicle body panel 18. The rigid mount disk 26 can be removably attached to the annular projection 34 below the rigid mount securing nut 28, which may attach to the annular projection 34 in any appropriate manner, such as but not limited to mechanical fasteners, glue, epoxy, welding, pressure fitting, etc.

The bearing 78 can be received within the housing body 36 of the rigid mount body 32, and secured by the bearing lock 40 in any appropriate manner, such as but not limited to mechanical fasteners, glue, epoxy, welding, pressure fitting, etc. The bearing 78 can be fitted around the damper securing nut 70 and secured in any appropriate manner, such as but not limited to mechanical fasteners, glue, epoxy, welding, pressure fitting, etc.

For assembly, the damper securing nut 70 can be disposed within the housing body 36 in axial alignment with the annular projection 34.

An upper end of the piston rod (e.g., the mounting shaft portion 22) is received by the bearing 78 through a bottom end of the housing body 36 through-channel 76 and secured to the bearing 78 by the damper securing nut 70. More particularly, the free end of the mounting shaft portion 22 is received through the housing body 36 through-channel 76 and the bearing lock 40, and secured within the head connector 102 of the damper securing nut 70 in any appropriate manner, such as but not limited to mechanical fasteners, glue, epoxy, welding, pressure fitting, etc.

In an alternative embodiment, the bearing adapter 42 can provide support for the coil spring 54, or alternatively a bump rubber, travel limiting device, etc. as desired for implementations within certain vehicles. The bearing adapter 42 can be received through the housing body through-channel 76, and secured to the bearing 78 in any appropriate manner, such as but not limited to mechanical fasteners, glue, epoxy, welding, pressure fitting, etc. A through-channel 130 of the bearing adapter 42 is configured to slidably receive the mounting shaft portion 22 to attach the piston rod 20 to the bearing 78.

The damper mount structure 24 of the embodiments utilizes a bearing mechanism that is capable of achieving axially non-compliant mounting of the damper 14. The disclosed embodiments can advantageously provide an alternative assembly to a bushing-type damper mount structure. Uses for the disclosed embodiments can include, but are not limited to, a suspension system for a vehicle. This structure is applicable to any type of vehicle, and may be particularly beneficial to high performance vehicles or racing vehicle implementations.

As discussed above in the Summary section, some related art damper mount structures secure an upper end of a suspension piston rod (e.g., of a strut or damper) to a bearing carried within a mount member, which is itself secured the vehicle body. The mounting structure can be held within a housing member, where the upper end of the piston rod can be secured to the vehicle body by a bearing and a nut, while a retaining member is threadedly engaged with a lower end of housing member to secure the bearing, bushing, and other members within the housing member. Rubber bushings can be used in a compliant damper mount structure as rubber insulators between metallic members based upon their vibration damping ability and flexibility of movement for the damper and mounting members. However, the related art bushing-type damper mount structure is subject to various disadvantages, especially in high performance or racing implementations.

A vertically compliant damper mount structure in such implementations can cause problems with the handling of a vehicle, such as with regard to weight transfer under braking or acceleration, pitch/dive, transient roll balance, lateral grip and roll rates in transitions, pulling or wandering of the vehicle, sluggish steering response, etc.

It may therefore be advantageous to provide a non-compliant damper mount structure (such as the damper mount structure 24 disclosed herein) that does not require a bushing-type damper mount (e.g., bushings made of a compliant material, such as rubber disposed on either side of a vehicle body panel 18 sandwiching the body panel). It may be particularly advantageous to provide this structure in damper installations where a non-compliant mounting is desired and where a damper rod or pin passes through the vehicle body panel 18. The rigid damper mount structure 24 of the embodiments can partially or fully remove vertical compliance from the piston rod 20 that is clamped around the vehicle body 16. The embodiments therefore address at least one of the above and/or other disadvantages of the related art, such as undesired compliance in a suspension system caused by compliant dampener mounting structures. The bearing 78 of the present embodiments can provide the necessary angular compliance to compensate for suspension movement during use without the addition of undesired vertical compliance.

IV. Alternative Damper Mount Configuration

Figure 6:
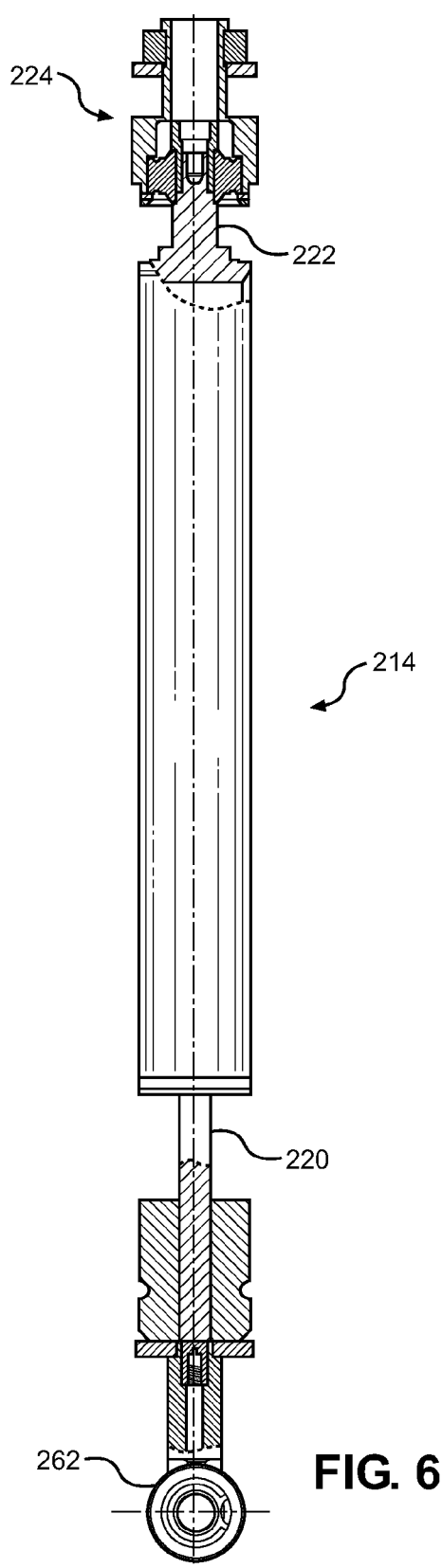
FIG. 6 is a perspective view of an alternative embodiment for a damper mount configuration.

FIG. 6 is a perspective view of an alternative embodiment for a damper mount configuration. The alternative damper mount configuration in FIG. 6 can include a damper 214 having similar features as the damper 14, including a piston rod 220, a mounting shaft portion 222, and a piston rod 220.

The alternative damper can be installed in the vehicle 10 in an inverted disposition in relation to the damper 14 illustrated in FIG. 1. The damper 214 can attach to a vehicle suspension member in any appropriate manner, such as but not limited to mechanical fasteners, glue, epoxy, welding, pressure fitting, etc. In the alternative embodiment in FIG. 6, a damper lower mount 262 can include an eye style mount that can attach to a suspension member of the vehicle 10, such as the trailing arm 48. The mounting shaft portion 222, disposed at the upper end of the alternative damper 214, can be received and secured into the damper mount structure 24. In this alternative configuration, the mounting shaft portion 222 can be secured to the vehicle body 18 at a first end of the alternative damper 214, and the piston rod 220 can be secured to a suspension member via the damper lower mount 262 at a second end.

V. Alternative Embodiments

While certain embodiments of the invention are described above, and FIGS. 1-5 disclose the best mode for practicing the various inventive aspects, it should be understood that the invention can be embodied and configured in many different ways without departing from the spirit and scope of the invention.

For example, embodiments are disclosed above in the context of a damper with an exterior cylindrical shaped body. However, embodiments are intended to include or otherwise cover any shape of a damper, such as but not limited to round, square, polygonal, unequal or special shapes, etc., to suit the mechanism being dampened.

Embodiments are disclosed above in the context of the damper mount structure 24 being constructed of steel. However, embodiments are intended to include or otherwise cover any type of rigid material for a damper mount structure, such as but not limited to aluminum alloy, carbon-infused plastic, other metallic alloys, etc.

Embodiments are disclosed above in the context of the damper securing nut 70 being used to secure the piston rod 20 to the bearing 78. However, exemplary embodiments also are intended to include or otherwise cover other attachment configurations of the bearing 78 to the piston rod 20, such as but not limited to mechanical fasteners, glue, epoxy, welding, pressure fitting, etc.

In the exemplary embodiment of FIG. 1, the damper mount structures 24 are arranged in a substantially vertical alignment in vehicle 10. However, embodiments are intended to include or otherwise cover include any appropriate positioning of the damper mount structure 24 relative to a suspension system mechanism. FIG. 1 also shows two damper mount structures 24 mounted to a rear trailing arm 48 of a vehicle 10. Alternative embodiments may include a fewer or greater number of the damper mount structures 24 arranged in similar or different patterns that are appropriate for a suspension in a vehicle including front suspension systems or more than one damper 14 per wheel 50.

The embodiments are intended to include or otherwise cover vehicular dampening applications including a front suspension system or multi-axle chassis with more than the standard two axles or less than the standard two axles.

In the exemplary embodiment of FIG. 4, the annular projection 34 is secured by the rigid mount securing nut 28 to the vehicle body panel 18. However, embodiments are intended to include or otherwise cover one or more adapters, securing nuts, locking mechanisms, etc., such as but not limited to mechanical fasteners, glue, epoxy, welding, pressure fitting, etc. that can secure the annular projection 34 to the vehicle body 16.

Exemplary embodiments are intended to include or otherwise cover any type of damping mechanism and/or suspension system that can be attached to damper mount structure 24.

Exemplary embodiments are intended to include or otherwise cover any type of manufacturing of the members and structures of the embodiments.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A structure for mounting a damper that includes a piston rod to a vehicle structural member that defines an aperture, the structure comprising:
   a hollow rigid mount body that includes an upper portion that extends through the aperture so as to project above the vehicle structural member, and a lower portion that is disposed beneath the vehicle structural member, the lower portion defining an outer diameter that is larger than an outer diameter of the upper portion;
a rigid mount securing member that is configured to be disposed around an exterior of the upper portion of the rigid mount body and so that the vehicle structural member is located between the rigid mount securing member and the lower portion of the rigid mount body; and
a bearing assembly disposed within the lower portion of the rigid mount body and configured to retain an upper portion of the piston rod of the damper within the lower portion of the rigid mount body while allowing the piston rod to move in a direction at an angle relative to an axis of the aperture of the vehicle structural member.

2. The structure of claim 1, wherein the rigid mount securing member is disposed so as to be coaxial with the upper portion of the rigid mount body.

3. The structure of claim 1, wherein the bearing assembly includes a damper securing member disposed around and in contact with the piston rod of the damper.

4. The structure of claim 3, wherein the bearing assembly includes a bearing disposed around an exterior of the damper securing member and in contact with an inner wall of the lower portion of the rigid mount body.

5. The structure of claim 4, further including a rigid mount disk disposed between the rigid mount securing member and the vehicle structural member, and around an exterior of the upper portion of the rigid mount body.

6. The structure of claim 5, further including a bearing lock disposed within the lower portion of the rigid mount body and beneath bearing, the bearing lock being configured to secure the bearing within the lower portion of the rigid mount body.

7. The structure of claim 6, further including a bearing adaptor disposed beneath the damper securing member, and configured to support a coil spring of the damper.

8. The structure of claim 7, wherein the damper securing member defines a first stepped portion, and the bearing adaptor defines a second stepped portion that faces the first stepped portion, the bearing being disposed so as to be held between the first and second stepped portions within the lower portion of the rigid mount body.

9. The structure of claim 1, wherein the rigid mount securing member defines a channel having a diameter that is sized relative to an outer diameter of the upper portion of the rigid mount body to enable the rigid mount securing member to be rigidly secured to an exterior surface of the upper portion of the rigid mount body.

10. The structure of claim 9, wherein the rigid mount securing member is a nut.

11. A damper assembly that is configured for mounting to a vehicle structural member that defines an aperture, the damper assembly comprising:
a damper that includes a piston rod; and
a structure for mounting the damper to the vehicle structural member, the structure including:
a hollow rigid mount body that includes an upper portion that extends through the aperture so as to project above the vehicle structural member, and a lower portion that is disposed beneath the vehicle structural member, the lower portion defining an outer diameter that is larger than an outer diameter of the upper portion,
a rigid mount securing member that is configured to be disposed around an exterior of the upper portion of the rigid mount body and so that the vehicle structural member is located between the rigid mount securing member and the lower portion of the rigid mount body, and
a bearing assembly disposed within the lower portion of the rigid mount body and configured to retain an upper portion of the piston rod of the damper within the lower portion of the rigid mount body while allowing the piston rod to move in a direction at an angle relative to an axis of the aperture of the vehicle structural member.

12. The damper assembly of claim 11, wherein the rigid mount securing member is disposed so as to be coaxial with the upper portion of the rigid mount body.

13. The damper assembly of claim 11, wherein the bearing assembly includes a damper securing member disposed around and in contact with the piston rod of the damper.

14. The damper assembly of claim 13, wherein the bearing assembly includes a bearing disposed around an exterior of the damper securing member and in contact with an inner wall of the lower portion of the rigid mount body.

15. The damper assembly of claim 14, further including a rigid mount disk disposed between the rigid mount securing member and the vehicle structural member, and around an exterior of the upper portion of the rigid mount body.

16. The damper assembly of claim 15, further including a bearing lock disposed within the lower portion of the rigid mount body and beneath bearing, the bearing lock being configured to secure the bearing within the lower portion of the rigid mount body.

17. The damper assembly of claim 16, further including a bearing adaptor disposed beneath the damper securing member, and configured to support a coil spring of the damper.

18. The damper assembly of claim 17, wherein the damper securing member defines a first stepped portion, and the bearing adaptor defines a second stepped portion that faces the first stepped portion, the bearing being disposed so as to be held between the first and second stepped portions within the lower portion of the rigid mount body.

19. The damper assembly of claim 11, wherein the rigid mount securing member defines a channel having a diameter that is sized relative to an outer diameter of the upper portion of the rigid mount body to enable the rigid mount securing member to be rigidly secured to an exterior surface of the upper portion of the rigid mount body, and wherein the rigid mount securing member is a nut.

20. A method of mounting a damper, which includes a piston rod, to a vehicle structural member that defines an aperture, the method comprising:
extending an upper portion of a hollow rigid mount body through the aperture so as to project above the vehicle structural member;
disposing a lower portion of the hollow rigid mount body beneath the vehicle structural member, the lower portion being configured so as to define an outer diameter that is larger than an outer diameter of the upper portion;
disposing a rigid mount securing member around an exterior of the upper portion of the rigid mount body, so that the vehicle structural member is located between the rigid mount securing member and the lower portion of the rigid mount body; and
disposing a bearing assembly within the lower portion of the rigid mount body so that the bearing assembly retains an upper portion of the piston rod of the damper within the lower portion of the rigid mount body, while allowing the piston rod to move in a direction at an angle relative to an axis of the aperture of the vehicle structural member.

\* \* \* \* \*